Sept. 2, 1952 C. H. FRY 2,609,094
APPARATUS FOR TESTING AND SORTING THIN RUBBER GOODS
Filed July 28, 1950 8 Sheets-Sheet 1
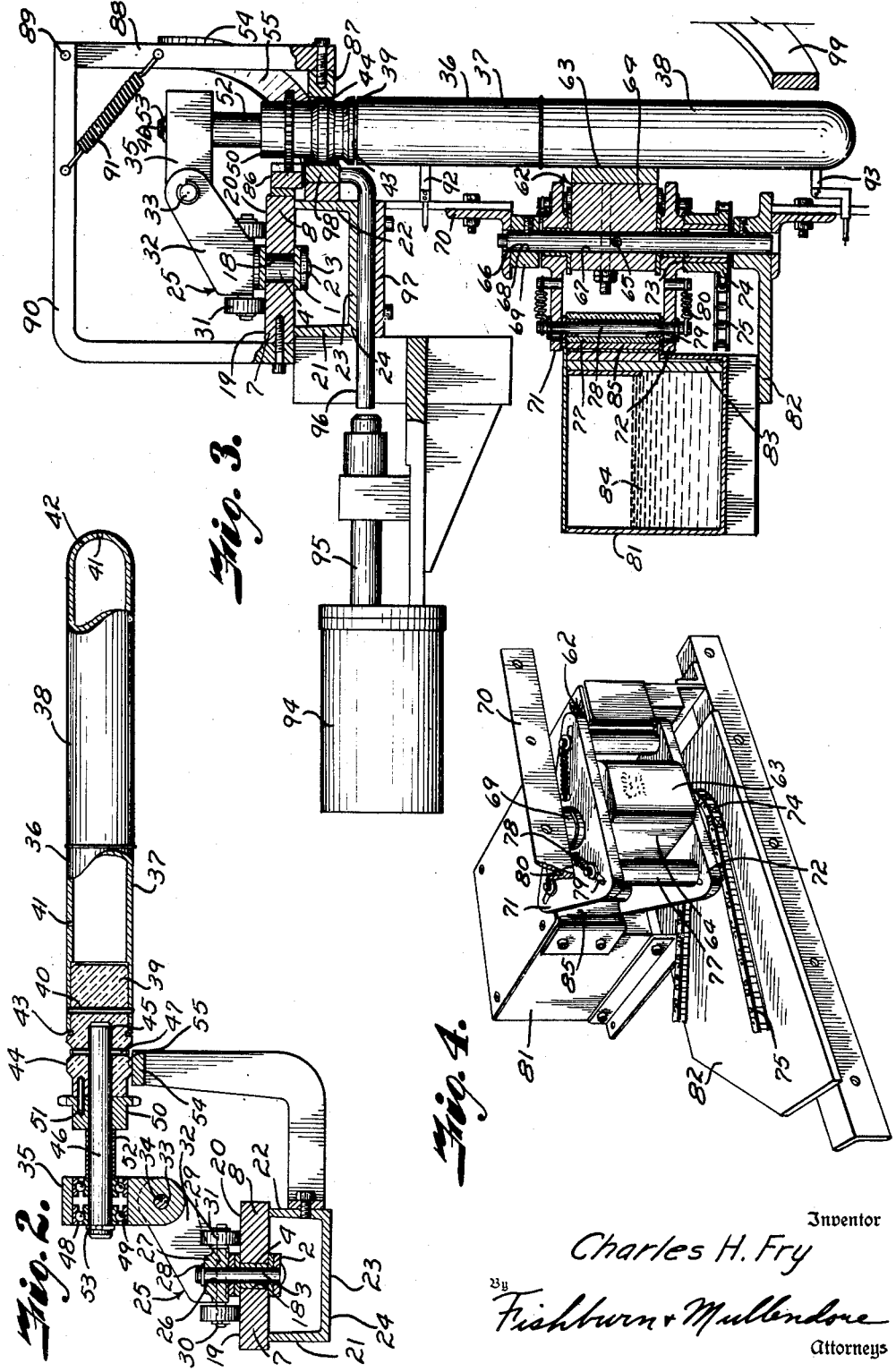
Inventor
Charles H. Fry
By
Fishburn & Mullendore
Attorneys

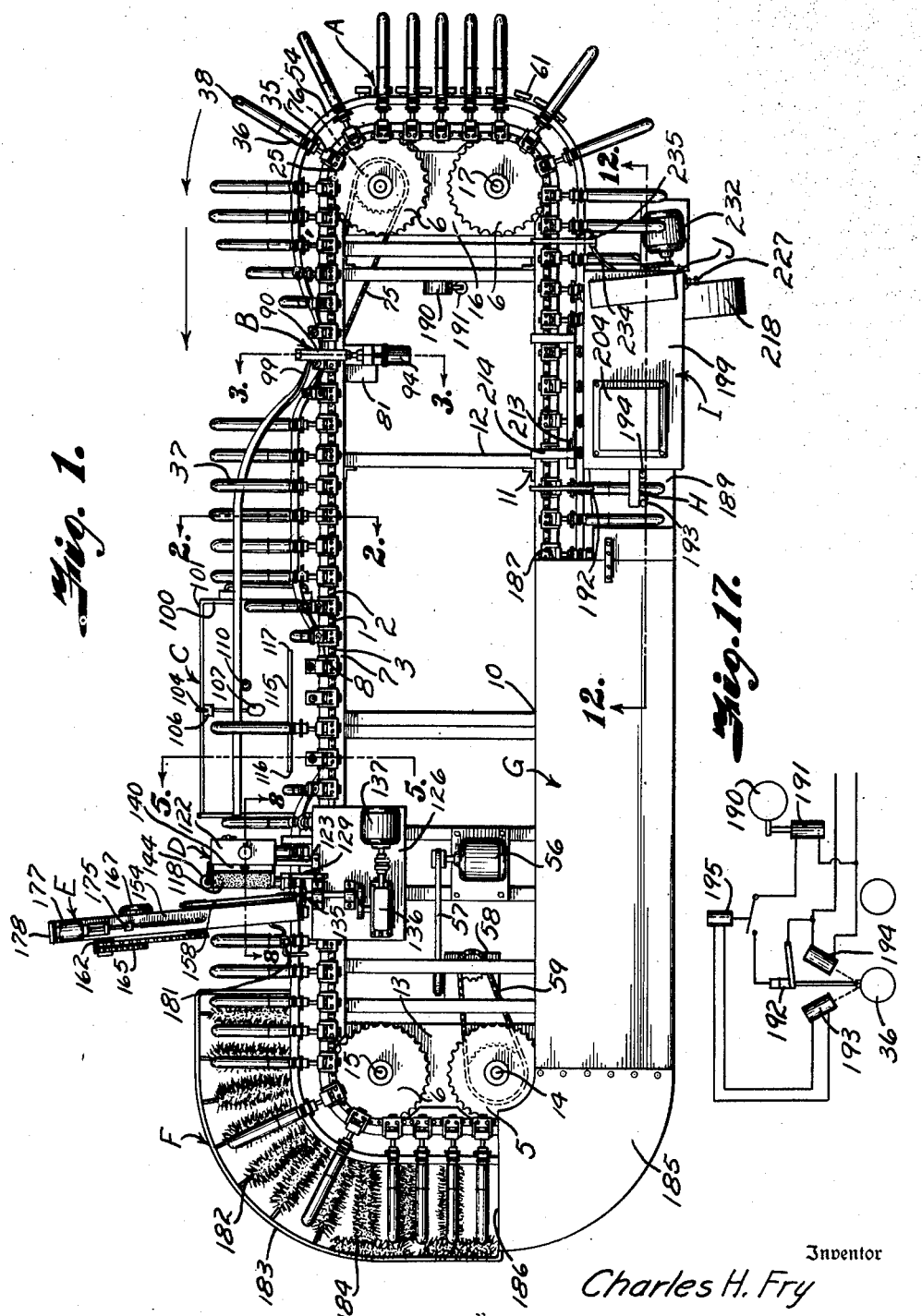

Sept. 2, 1952  C. H. FRY  2,609,094
APPARATUS FOR TESTING AND SORTING THIN RUBBER GOODS
Filed July 28, 1950  8 Sheets-Sheet 3

Inventor
Charles H. Fry
By
Fishburn + Mullendore
Attorneys

Sept. 2, 1952  C. H. FRY  2,609,094
APPARATUS FOR TESTING AND SORTING THIN RUBBER GOODS
Filed July 28, 1950  8 Sheets-Sheet 4
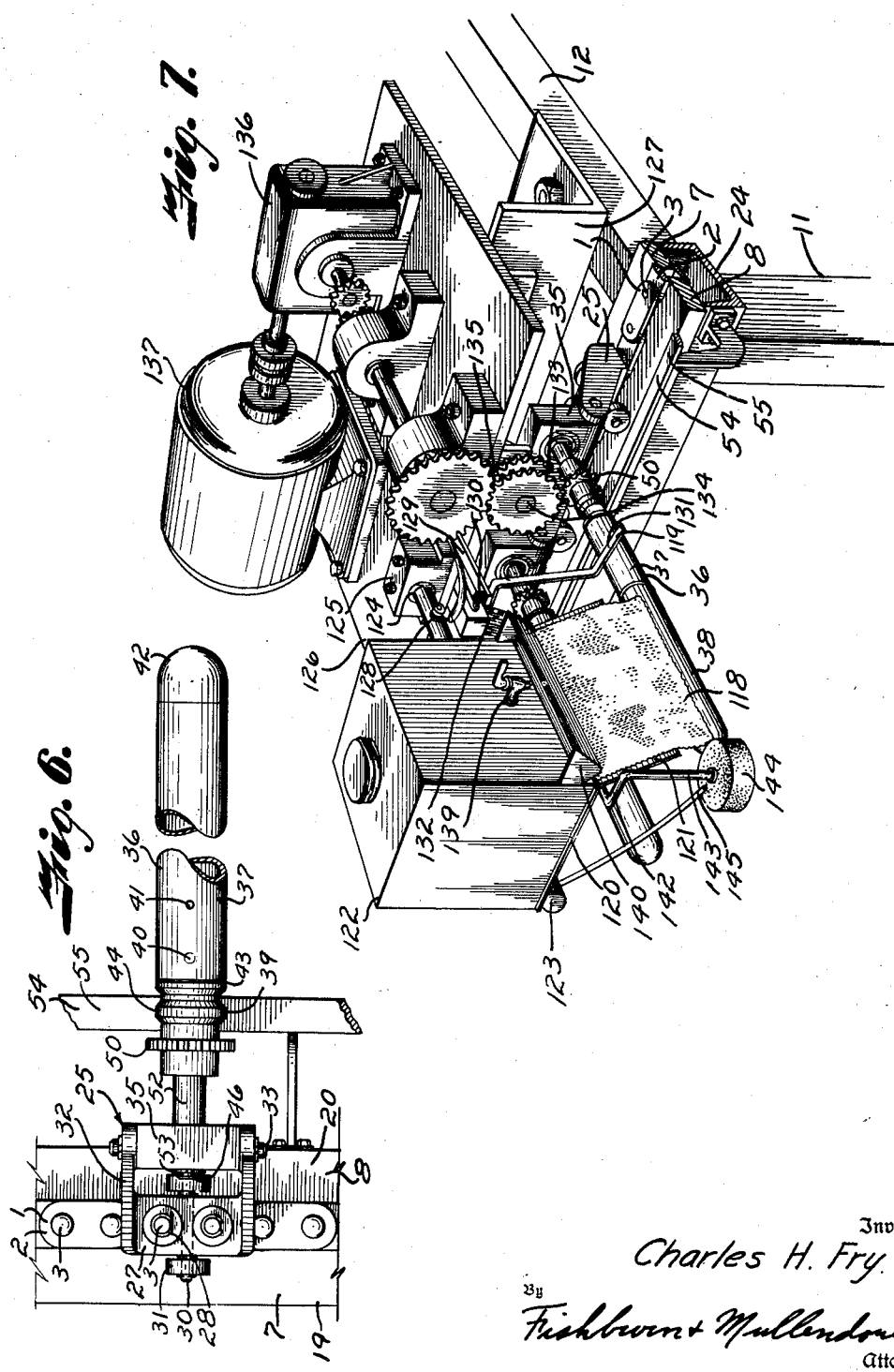
Inventor
Charles H. Fry.
By Fishburn + Mullendore
Attorney Sept. 2, 1952 C. H. FRY 2,609,094
APPARATUS FOR TESTING AND SORTING THIN RUBBER GOODS
Filed July 28, 1950 8 Sheets-Sheet 5

Inventor
Charles H. Fry
By Fishburn & Mullendore
Attorneys

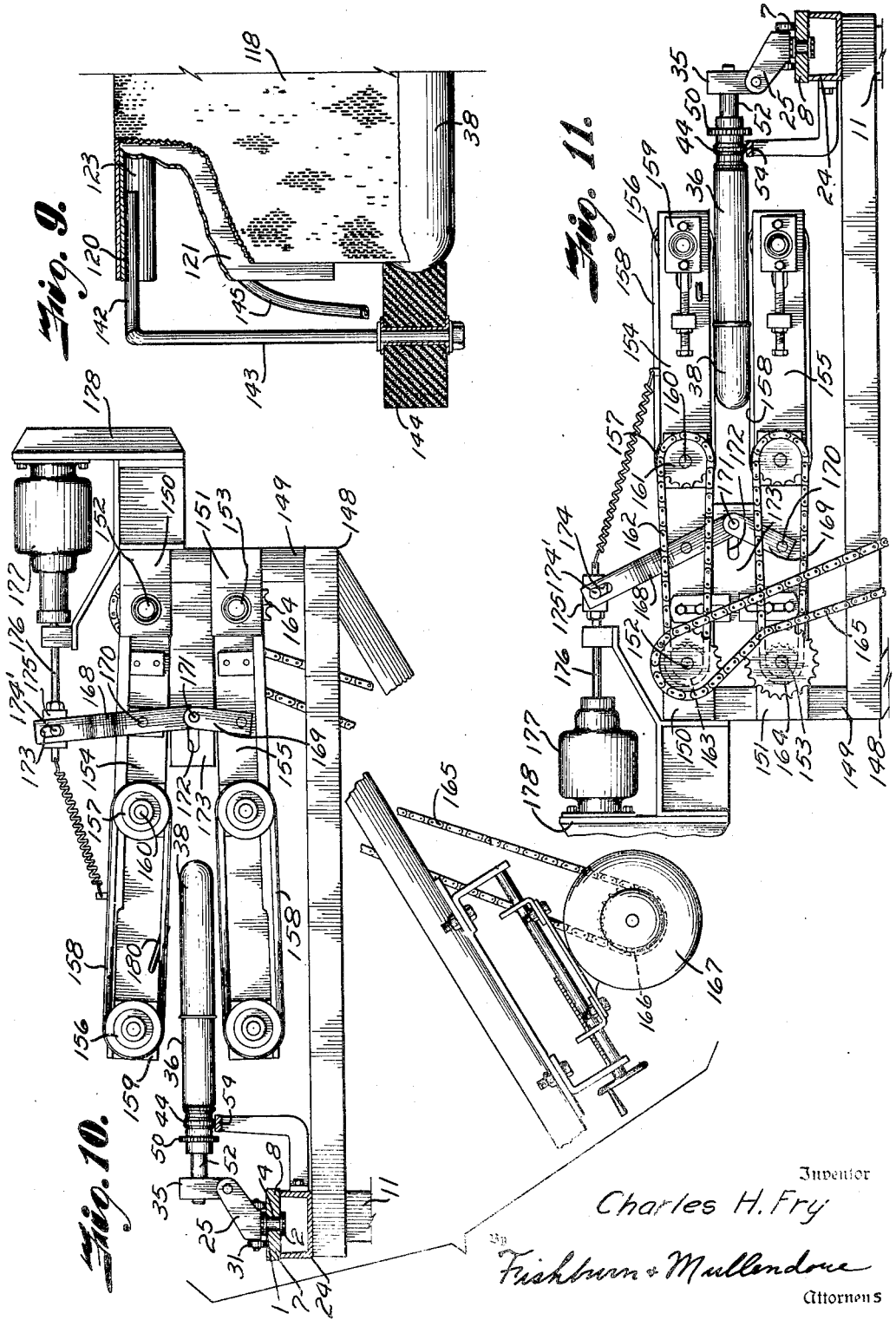

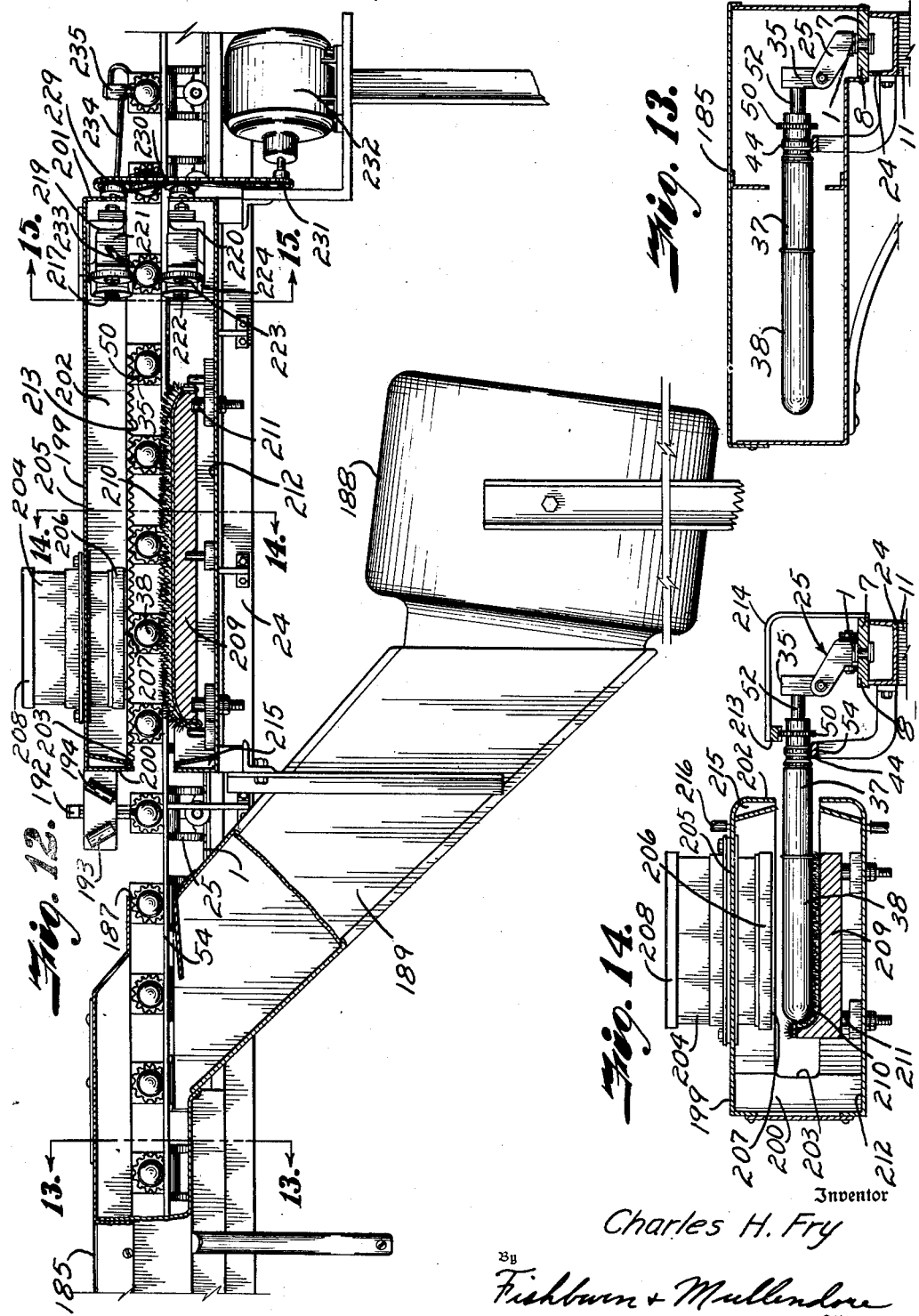

Sept. 2, 1952 C. H. FRY 2,609,094
APPARATUS FOR TESTING AND SORTING THIN RUBBER GOODS
Filed July 28, 1950 8 Sheets-Sheet 8
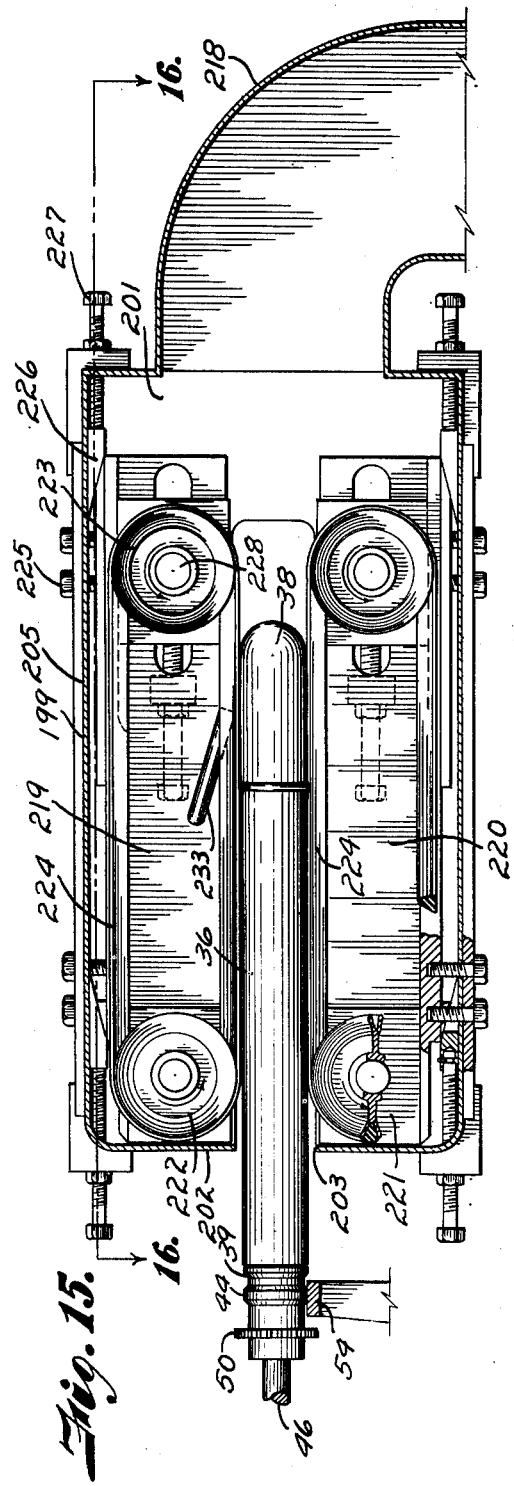
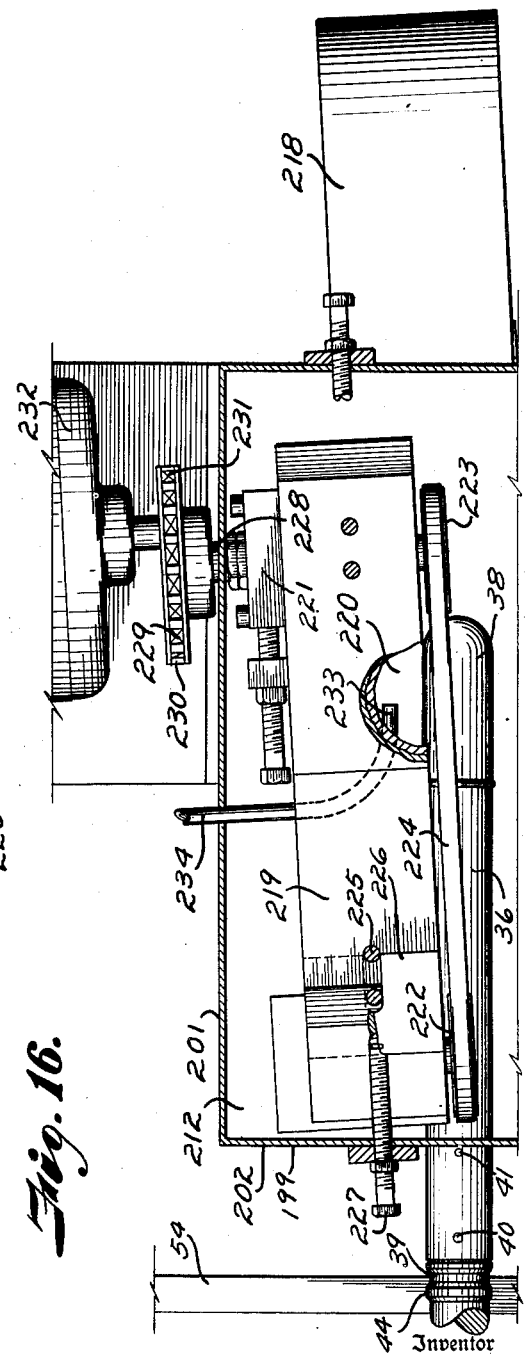
Inventor
Charles H. Fry
By
Fishburn & Mullendore
Attorneys Patented Sept. 2, 1952

2,609,094

UNITED STATES PATENT OFFICE 2,609,094

APPARATUS FOR TESTING AND SORTING THIN RUBBER GOODS

Charles H. Fry, North Kansas City, Mo., assignor to Dean Rubber Manufacturing Company, North Kansas City, Mo., a corporation of Missouri Application July 28, 1950, Serial No. 176,442

6 Claims. (Cl. 209—10)

1

This invention relates to methods and apparatus for printing, testing and ejecting thin rubber articles and more particularly for processing such articles after curing thereof and rejecting those having imperfections such as holes, perforations and wall sections below a predetermined minimum thickness.

Articles of thin rubber are commonly manufactured by dipping forms or the like into tanks or other containers of liquid rubber latex, rubber cement or other dipping solution and withdrawing said forms in such a manner that a coating of the dipping solution is deposited thereon. The coating is dried and the coated form again dipped. This is repeated until the coatings forming the articles are of desired thickness. The coated form then passes through a curing stage and is powdered and removed from the forms. Usually the article is rolled during the removal operation. While care is exercised during such manufacturing operations, imperfections such as holes, perforations and the like are frequently found in the finished articles. It is desirable that such imperfect articles be detected and rejected. Also each prophylactic article of thin rubber must have printed thereon certain required information regarding the manufacture and brand thereof.

With the foregoing in mind, the objects of the present invention are to provide a novel method and apparatus for printing and testing thin rubber prophylactic articles whereby any hole, perforation, or wall sections below minimum thickness are detected and the imperfect article rejected; to provide apparatus for detecting imperfections in thin rubber articles which includes the automatic rejection and removal of the imperfect article from said apparatus; to provide apparatus with a conveyor having mandrels of electroconductive material for receiving the articles to be printed and tested, and automatic controls for the various operations of printing or branding only the articles, locating of the mandrels, testing, rejecting and removal of imperfect articles, counting, powdering, and removal of acceptable articles; to provide an apparatus comprising in combination various features and elements synchronized to cooperatively process thin rubber articles, detecting and ejecting imperfect articles and delivering articles of acceptable quality printed, powdered, rolled and counted; to provide a conveyor having supporting forms or mandrels mounted thereon for both rotatable and revolvable movements in the testing and processing of the thin rubber articles; and to provide a continuous method and apparatus for testing and processing thin rubber prophylactic articles

2 which are accurate, foolproof and automatic in operation.

In accomplishing these and other objects of the present invention, I have provided improved details of structure, the preferred forms of which are illustrated in the accompanying drawings, wherein:

Fig. 1 is a plan view of an apparatus for printing, testing, rejecting, powdering and counting prophylactic articles of thin rubber.

Fig. 2 is an enlarged transverse sectional view through the conveyor element and mandrel mounting thereon taken on the line 2—2, Fig. 1.

Fig. 3 is a cross-sectional view taken on the line 3—3, Fig. 1, through the printing apparatus and selection mechanism therefor.

Fig. 4 is a perspective view of the printing apparatus.

Fig. 6 is a plan view of the conveyor and mandrel mounting thereon.

Fig. 7 is a perspective view of the article testing apparatus for detecting imperfect articles.

Fig. 9 is a detail sectional view through the apparatus for testing the ends of the articles.

Fig. 10 is a side elevation of the article ejection apparatus with a perfect article passing therethrough.

Fig. 11 is an elevation of the ejection apparatus from the opposite side thereof to Fig. 10 and illustrating the ejection apparatus removing an imperfect article.

Fig. 12 is a cross-sectional view through the drying and powdering apparatus on the line 12—12, Fig. 1.

Fig. 13 is a transverse sectional view through the drying chamber on the line 13—13, Fig. 12.

Fig. 14 is a transverse sectional view through the powdering apparatus on the line 14—14, Fig. 12.

Fig. 15 is a cross-sectional view through the apparatus on the line 15—15, Fig. 12, illustrating the removal of the perfect article.

Fig. 16 is a horizontal sectional view on the line 16—16, Fig. 15, showing the article removing apparatus.

Fig. 17 is a diagrammatic view of the actuating mechanism for the counter.

Figure 5:
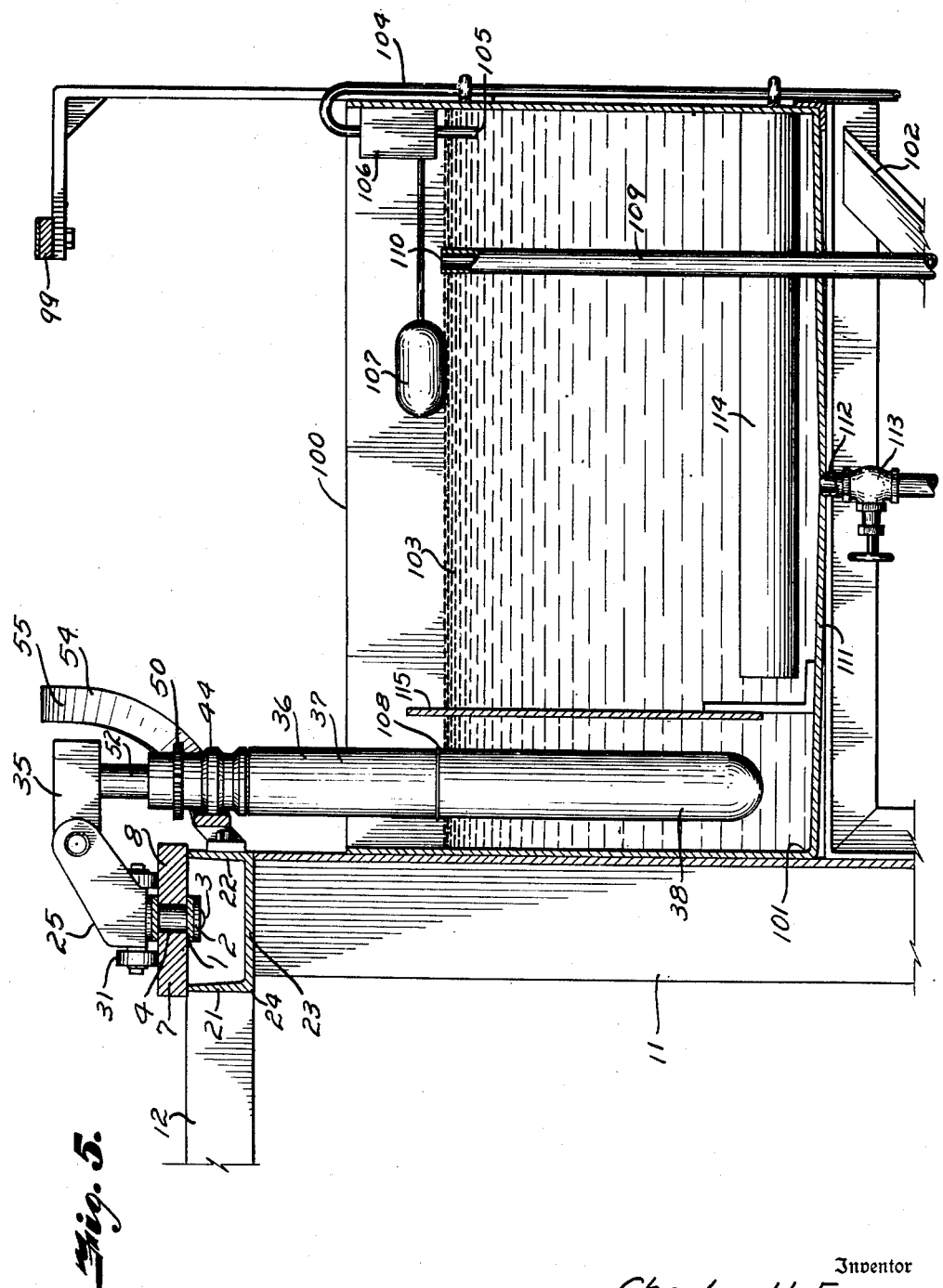
Fig. 5 is an enlarged cross-sectional view through the article wetting tank taken on the line 5—5, Fig. 1.

Referring more in detail to the drawings:

I designates generally an endless conveyor of the chain type and preferably of the articulated link type having pairs of side bars or links 2 pivotally connected to the adjacent or next pair of bars 2 by means of a pin 3 which also carries a roller 4 interposed between said side bars or links 2 for engagement with the teeth of a driving sprocket 5 and a plurality of idler sprockets 6 in the usual manner. Movement of the chain conveyor is continuous and in the direction of the arrows, the path of movement being defined by the sprockets 5 and 6 and by track members 7 and 8 intermediate said sprockets.

In the apparatus illustrated, the sprockets 5 and 6 are located substantially in a common horizontal plane and supported on a frame 10 for rotation about vertical axes. The frame 10 is provided with the usual upright members 11 supporting a plurality of spaced transverse members 12, said upright members and transverse members being positioned as desired to form a structure of sufficient strength to properly mount the various elements thereon as hereinafter disclosed. The framework 10 is preferably elongated and adjacent one end thereof is a transverse member 13 on which is rotatably mounted a shaft 14 for the driving sprocket 5 and a shaft 15 for an idler sprocket 6, in such a manner that said sprockets are laterally spaced. The other end of the machine is provided with a transverse member 16 on which are rotatably mounted shafts 17 of two laterally spaced sprockets 6. With this arrangement the sprockets define the curved portions of the path of the chain conveyor 1 and the tracks 7 and 8 define the straight runs of the conveyor path between the sprockets.

The track members 7 and 8 are preferably spaced rectangular bars, the adjacent portions of which extend between the links 2 and have inner faces 18 engaging the rollers 4 of said chain conveyor. Said track members also are so constructed that the upper faces 19 and 20 respectively are flat and lie in a substantially common, horizontal plane. The respective track members are suitably secured to legs 21 and 22 extending upwardly from a web 23 of a channel member 24 suitably supported on the uprights 11 and transverse members 12 of the framework 10.

A plurality of spaced brackets 25 are suitably mounted on the conveyor 1 for movement therewith. The brackets may be secured to selected links of the conveyor chain, however, it is preferable that selected pairs of pins 3 be elongated and extend upwardly through bores 26 of bars 27 of the brackets 25 and the bars be retained in engagement with links 2 as by keepers or spring washers 28 suitably mounted adjacent the upper ends of the pins 3. The bars 27 are provided with transverse bores 29 intermediate the pins 3 for mounting shafts 30 which extend from the sides of the bars 27 for rotatably mounting rollers 31 having peripheries engaging the upper faces 19 and 20 of the track members 7 and 8 for preventing tilting of the bracket 25 and also aid in supporting the conveyor 1 relative to the tracks 7 and 8 and substantially eliminate frictional contact between the links 2 and the tracks 7 and 8.

The brackets 25 have ears 32 arranged at each end of the bars 27 and extending upwardly and outwardly over the outer track member 8, aligned apertures being located adjacent the ends of the ears for receiving pins 33 which extend through apertures 34 of arms 35 whereby said arms are hingedly mounted on the respective brackets 25. Mandrels or like supporting forms 36 for thin rubber articles are carried by the arms 35 and extend therefrom as illustrated in Fig. 2. The mandrels are rotatably mounted about their axes which are spaced from and perpendicular to the axes of the pins 33 whereby the hinging of the arms 35 provides a swinging movement of the mandrels in a plane perpendicular to the plane of the travel of the chain conveyor 1 and extend outwardly from said conveyor at various inclinations thereto for processing articles on the mandrels as later described.

The mandrels 36 preferably comprise a hollow, main body portion 37 of suitable metal or other electro conductive material and a base or hub portion 39 of suitable dielectric material such as plastic, hard rubber or the like. As shown, the main metal body portion 37 is hollow and of suitable size to receive and support the rubber articles 38 without wrinkling same. The body portion is pressed upon the adjacent end portion of the base or hub 39 and is suitably secured thereto as by a pin 40 extending through aligned apertures in the body portion and hub. Each mandrel body portion is preferably provided with one or more apertures or vents 41 through which air may pass from the interior of the rubber articles when mounting the same on said mandrels. The body portions 37 of the mandrels 36 are of greater length than the normal length of the articles and are of the same or greater diameter than the normal diameter of the articles so that the latter are supported thereon in smooth condition and closely engaging the form. Each of the mandrels preferably has a closed end 42 that substantially conforms to the shape of the articles whereby the articles will engage same. The dielectric base or hub portion 39 extends from the end 43 of the body portion of the mandrel and is provided with an enlarged portion 44 having substantially the same diameter as the diameter of the article on the body portion of the mandrel and having a frictional periphery to form a roller. Each hub 39 is provided with a bore 45 coaxial with the body portion of the mandrel for receiving a shaft 46 which is suitably secured to the hub as by a pin 47. Said shaft extends from the hub and is rotatably mounted in antifriction bearings 48 carried in a bore 49 in the respective arms 35, said bore 49 being perpendicular to and spaced from the bores 34 of said arms. A gear or the like 50 is mounted on the shaft 46 adajcent the end of the hub 39 and is keyed to the hub by a pin 51. The mandrel 36 is maintained against longitudinal movement relative to the arms 35 by a spacer 52 sleeved on the shaft 46 between the sprocket and the antifriction bearings and a spring retainer or lock washer 53 adjacent the end of the shaft and engaging the other side of the antifriction bearing. Thus the mandrels including their main bodies, hubs 39, shafts 46 and gears 50 are free to rotate in the antifriction bearings carried by the arms 35 and at the same time by virtue of the pivotal connection of the arms with the brackets 25, said mandrels are movable in a plane perpendicular to the plane of travel of the conveyor chain 1. The inclination or angularity of the mandrels is controlled by cam rails 54 disposed along the conveyor and suitably supported on the channels 24 and having friction surfaces 55 adapted to be engaged by the peripheries of the enlarged portions 44 of the hubs so that the mandrels 36 are caused to roll therealong and rotate as they are advanced by the conveyor chain 1.

The conveyor 1 is driven by a motor 56 suitably supported on transverse members 12 and having driving connection as through a belt 57 with a gear reduction unit 58 which has driving connection as through a chain 59 with the shaft 14 of the driving sprocket 5, whereby operation of the motor 56 effects rotation of the sprocket 5 which has driving engagement with the chain conveyor 1 and moves same in a path as defined by the sprockets 5 and 6 and the tracks 7 and 8 to advance the mandrels and move same through the various stations for processing the thin rubber articles carried on the mandrels.

A station is provided at A for applying to the mandrels goods or articles 38 to be tested. At station B those mandrels having thin rubber articles thereon are moved whereby the articles are properly printed or branded. At station C the rubber articles on the mandrels carrying same are wetted by water or other suitable liquid. At station D is an electrical testing unit and a device for manifesting a defective article so it may be discarded. At station E there is apparatus for discarding the defective articles. At station F any water or wetting liquid on the rubber articles is spread to facilitate drying. At station G the articles are dried. At station H the perfect or acceptable tested articles are counted. At station I the rubber articles are powdered. At station J acceptable tested articles are rolled off the forms or mandrels, automatically discharged from the apparatus and delivered to a point for further handling, packaging, etc.

At station A the cam rail 54 is provided with a depending flange on which are mounted a plurality of closely spaced antifriction rollers 61 of such diameter that the peripheries extend above the upper surface of the cam rail whereby the body portion 37 of the mandrels 36 engages the roller peripheries and the enlarged portions 44 of the hub portions 39 are maintained in spaced relation with the cam rails 54. The engagement of the body portions 37 of the mandrels with the rollers 61 causes said rollers to rotate as the mandrels are advanced thereover, the mandrels remaining stationary relative to the bearings 48. Thin rubber articles 38 are manually mounted upon the mandrels by one or more operators during the course of travel of the chain conveyor 1 and mandrels at the loading station A. As the mandrels leave station A the enlarged portions 44 rest on the upper surface of the cam rail 54 whereby as the chain conveyor 1 is advanced the frictional contact between the enlarged portions 44 and the cam rail 54 effects rotation of the mandrels with the articles mounted thereon, said mandrels being supported by the cam rail in a laterally projecting, substantially horizontal position.

Adjacent the station B the cam rail turns downwardly and inwardly and the mandrels swing downwardly on the pins 34 and are positioned substantially in a vertical position as they enter station B. A printing or branding mechanism 62 is located at station B. Said printing mechanism consists of a stamp or branding device 63 suitably secured on a block 64 which is keyed or otherwise secured by a pin 65 on a vertical shaft 66 extending through a bore 67 in said block and having ends fixed in bores 68 of vertically spaced bosses 69 which are supported by structural members 70 on the frame 10. Spaced plates 71 and 72 are rotatably mounted on the shaft 66 immediately above and below the block 64, said lower plate having a hub 73 on which is fixed a sprocket 74 operatively engaged by a chain 75 which is driven by a sprocket 76 on a shaft 17 of an idler sprocket 6. The idler sprocket 6 being turned by the conveyor chain 1 rotates the shaft 17 and drives the sprocket 74 and plates 71 and 72 at such a rate that inking rollers 77 carried by said plates are moved over the face of the stamp 63 intermediate the movement of a mandrel thereby. The inking rollers 77 are rotatably mounted on shafts 78, the ends of which extend through slots 79 in the plates 71 and 72, springs or like resilient members 80 being connected with the shafts 78 and urging same toward the shaft 66. In the particular structure shown, the plates 71 and 72 are substantially triangular and have three inking rollers thereon, and a roller passes over the stamp and inks same in the interval between the movements of the mandrels over the stamp. The ink is replenished in the rollers 77 from an ink tank 81 suitably supported on a plate 82 that extends from the structural members, said tank being so located that a wicking 83 extending into the body of ink 84 carries the ink to a pad 85 so positioned that the rollers 77 are rolled across the pad on the opposite side of their circle of rotation relative to the stamp 63.

As the mandrels advance toward the printing or branding mechanism they are in a substantially vertical position with the enlarged portions 44 engaging the cam rail 54. This tends to rotate the mandrels, however, to assure positive rotation of said mandrels and thereby avoid smearing of the ink in the branding operation, a rack 86 is suitably secured to the track member 8 in position to be engaged by the teeth of the gears 50, said rack extending along the length of station B to assure positive rotation of the mandrels therein. As the mandrels with the articles thereon are advanced along and in contact with the stamp 63, pressure is applied tending to swing the mandrels into engagement with the stamp to assure positive branding of the article on the mandrel. This pressure is applied by a pressure block 87 which engages the enlarged portion 44 on the mandrel hub and is carried on the lower end of an arm 88, the upper end of said arm being pivotally mounted as at 89 on a bracket 90 suitably secured to the track member 7 and extending upwardly over the chain conveyor, a spring 91 having ends connected to the bracket 90 and arm 88 to apply pressure to the pressure member 87.

If the operators at station A fail to mount a thin rubber article on each of the mandrels, the empty mandrels will be advanced past station B and it is desirable that said empty mandrels be detected and moved in such a manner as to avoid printing on the empty mandrel. Electrical contacts 92 and 93 are mounted on the frame immediately ahead of the printing mechanism and so positioned that the contact 92 engages the mandrel body member 37 adjacent the hub portion, and the contact 93 engages the portion of the mandrel normally covered by a thin rubber article. The contacts are connected in a suitable electric circuit whereby an empty or bare mandrel completes the circuit between the contacts 92 and 93. If a rubber article is on the mandrel, said article serves as an insulator and prevents completion of the circuit. When an empty mandrel engages the contacts 92 and 93, electric circuit is completed to a solenoid 94, arranged on the frame in such a manner that the armature 95 is in alignment with a bar 96 slidably mounted in a support 97 below the channel 24. The bar 96 carries a head 98 that normally is in alignment with the cam rail 54 and forms a portion thereof, and when the solenoid 94 is energized it moves the armature 95, pushing the bar 96 and the head 98 thereon and swings the mandrel outwardly to an inclined position whereby the lower end of the mandrel moves into engagement with the outer surface of a guide track 99 which turns upwardly and outwardly whereby as the mandrel is advanced it is swung upwardly to a horizontal position as it moves beyond the station B. The electrical circuit (not shown) is such that a solenoid 94 is maintained in energized condition for a predetermined period of time sufficiently for the mandrel to advance into contact with the guide 99.

The cam rail 54 is turned upwardly and outwardly and then extends along the track members whereby mandrels having rubber articles thereon are elevated to an inclined position as they leave station B and advanced with the outer ends thereof below the guide track 99 and above the upper edge 100 of a tank 101 located at station C whereby the mandrels may be advanced to a position overlying said tank. The tank 101 is suitably supported on a bracket 102 extending outwardly from the frame 10 with a side wall of said tank substantially engaging the uprights 11 below the flange 22 of the channel 24, as illustrated in Fig. 5. The tank is of suitable size and the cam rail so arranged that as the chain conveyor 1 advances the mandrels the cam rail will support same whereby they will pass over the upper edge of the walls of the tank and then said mandrels swing downwardly to a substantially vertical position and move longitudinally of said tank until they approach the other end of same where the cam rail turns upwardly and outwardly and elevates the mandrels to a substantially horizontal position whereby they will pass over the wall of the tank. The tank is adapted to contain a quantity of water 103 in which a suitable wetting agent is incorporated. A pipe 104 connected to a suitable source of water supply extends into the tank and terminates in an open end 105 preferably below the water level. The delivery of water to the tank is controlled by a valve 106 which is actuated by a float 107 adapted to maintain the level of water slightly below the open or upper end of the thin rubber article 38 as at 108. An overflow pipe 109 having an open end 110 positioned slightly above the level of the water in the tank provides for an overflow to prevent the water level from extending above the upper end of the rubber articles, said overflow pipe extending downwardly through the bottom 111 of the tank. A drain 112 is provided in the bottom of the tank and controlled by a valve 113 whereby all of the water in the tank may be drained out for cleaning as desired. It is preferable that the water be heated as by an immersion type electric heater 114 located adjacent the bottom of the tank and connected with a suitable source of electric current and provided with a suitable thermostat to regulate the temperature of the water. A vertical partition or baffle 115 is arranged longitudinally of the tank and suitably supported therein whereby the mandrels move between the baffle and the side of the tank adjacent the frame 10. The lower edge of the baffle is spaced from the bottom 111 and the end edges 116 and 117 are spaced from the ends walls of the tank sufficiently to provide space for movement of the wetting liquid whereby the temperature is substantially uniform and also provide space for the swinging movement of the mandrels as they are lowered into the tank and elevated out of the tank under control of the cam rail 54.

Movement of the mandrels through the water bath thoroughly wets the outer surface of the rubber articles and if there are any perforations or holes in the articles the water will seep through to the interior of the article. This seepage through small perforations is expedited by the wetting agent that is placed in the water. The guide track 99 extends longitudinally of the tank 101 and supports empty mandrels above the tank as they are advanced thereover. The guide track terminates at the end of the tank and the empty mandrels then move along with the mandrels having rubber articles thereon, all of said mandrels being held in a substantially horizontal position by the cam rail 54.

Figure 8:
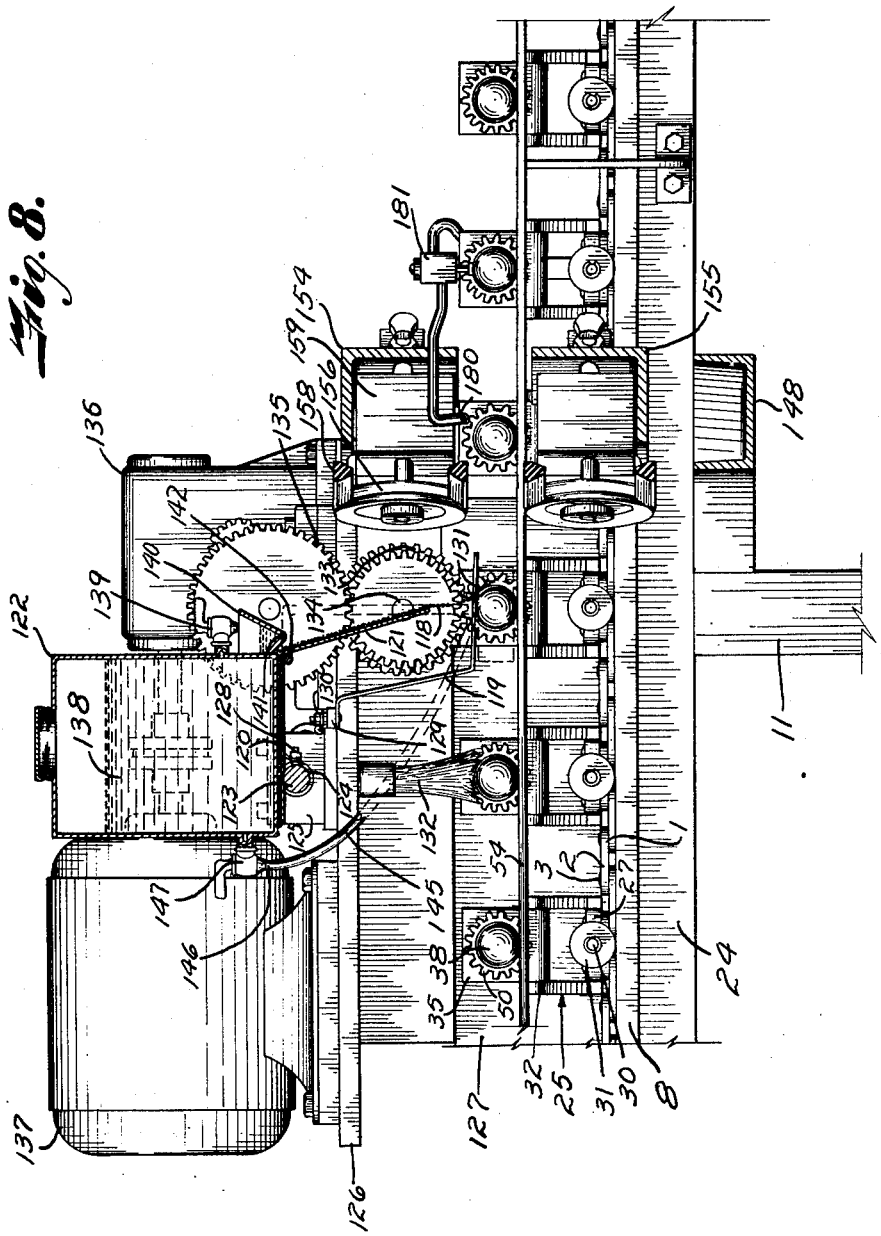
Fig. 8 is a sectional view on the line 8—8, Fig. 1, particularly illustrating the testing apparatus.

Station D for the electrical testing and manifesting defective articles is adjacent the end of the tank 101 and the rubber articles on the mandrels are wet from the water 103 as they enter said station D. The electrical testing unit as shown in Figs. 7 and 8, comprises an electric conductor element 118 which is connected to a source of high tension electric current and which is adapted to be engaged by the portion of the mandrels carrying the rubber articles thereon and to shape itself about and conform to a portion of said mandrels along substantially the entire length of the mandrel covered by the rubber article 38. The mandrel body portions 37, being of metal or electro conductive material are connected in the high tension circuit by engagement with an electrical contact 119 so that a high electrical potential is present between the element 118 and mandrel body portion 37 thereunder which are separated only by the nonconducting rubber article. This potential is sufficient to leap an air gap of the thickness of the article but not sufficient to pierce the goods except when the latter have thin spots. Hence articles with the smallest of pin holes or which are under the desired thickness will permit a current to flow in the high tension circuit.

The element 118 preferably is a sheet of fine mesh, flexible metal fabric, suitably supported as on a plate 120 above the path of the article carrying portions of the mandrels whereby the element depends from the plate with the lower portion in wiping contact with the rubber article carrying portions of the mandrel. The plate 120 is provided with a downwardly extending portion 121 sloping in the direction of travel of the mandrels and terminating in spaced relation to the mandrels whereby the element 118 lies on the sloping portion 121 and hangs from the lower edge thereof. Resting on the plate 120 and element 118 thereon is a water tank 122, said tank, plate 120 and element 118 being supported by and suitably secured to a rod 123 located above the path of travel of the mandrels and having an end supported in an insulating bushing 124 mounted in a block 125 carried on a plate 126 which is supported by structural members 127 on selected transverse members 12 of the frame 10. A conductor leading to a suitable source of high tension electric current is connected as at 128 to the rod 123 for supplying current to the element 118. The contact 119 preferably consists of a resilient metal member suitably supported on an arm 129 extending outwardly from the plate 126 and is connected as at 130 to a conductor connected in the high tension electric circuit. The element 119 depends from the arm 129 and terminates at its lower end in a wiping foot 131 adapted to resiliently engage the metal body portion 37 of the mandrel between the rubber article and the hub portion thereof.

As the mandrels approach the element 119 the portion contacted by said element is engaged by a brush 132 which wipes from the mandrel any dust or the like that might interfere with the making of the circuit by contact of the element 119 and the mandrel body portion 37. In order to insure engagement of the element 118 with the entire periphery of the rubber article, the mandrel is rotated through more than a complete revolution during the period in which the element 118 is in contact with the rubber article. This rotation is effected by the gear 50 meshing with a gear 133 suitably supported on a countershaft 134 and driven by suitable power transmission means consisting of a gear chain 135, speed reducer 136, and prime mover 137, all supported on the plate 126 as illustrated in Fig. 7. To further insure electrical contact of the element 118 with the rubber article, the tank 122 contains a quantity of water 138 and has a valve controlled discharge 139 which is regulated to maintain a small flow of water into a trough 140 mounted on the side of the tank above the element 118 and substantially coextensive therewith, said trough having a plurality of apertures 141 in the bottom thereof whereby the water drips onto the element 118 to maintain same in a wet condition.

An arm 142 of electro conductive material is secured, as by welding, to the plate 120 and extends outwardly therefrom, said arm terminating in a depending shaft 143 on which is rotatably mounted a roller 144 positioned for resiliently engaging the ends of the mandrels. The roller 144 is preferably made of porous, resilient material, such as sponge rubber, whereby when it is pressed against the end of the mandrel it will conform substantially to the shape thereof. The roller is preferably maintained in wet condition by water that is delivered thereto through a duct 145 which communicates as at 146 with the tank 122, the flow through the duct being controlled by a valve 147. The water absorbed in the porous roller forms an electrical conductor, electrically connected through the arm 142, plate 120 and rod 123, in the high tension circuit to maintain a high potential at the ends of the mandrels whereby perforations or relatively thin spots in the ends of the rubber articles will permit current to flow in the circuit, through the mandrel and contact 119 said high tension circuit being such that when completed it starts operation of the article discarding mechanism at station E.

The article discarding mechanism is arranged in the apparatus in the path of the mandrel moving from contact with the element 118 and has less spacing from the element 118 than the spacing between adjacent mandrels. Also the discarding mechanism is such that it is maintained in operation for a period of time which approximately equals the time required for the mandrels to be advanced the distance equivalent to the spacing between the mandrels. The discarding mechanism consists of a bracket 148 suitably supported on the frame 10 and extending outwardly therefrom. A post 149 is mounted on the outer end of the bracket 148 and extends upwardly therefrom carrying vertically spaced ears 150 and 151 in which are rotatably mounted horizontal shafts 152 and 153. Arms 154 and 155 are rotatably mounted on the shafts 152 and 153 respectively and extend toward a chain conveyor 1, one of said arms being above the other below the path of the mandrels and adapted to be swung toward same as later described.

The arms 154 and 155 are arranged at an angle to the mandrels with the ends of said arms adjacent the conveyor closer to the approaching mandrels than the opposite ends of the arms which are mounted on the shafts 152 and 153. Spaced pulleys 156 and 157 are rotatably mounted on each of the arms 154 and 155, said pulleys all being substantially in the same vertical plane. Belts 158 operatively connect each set of pulleys 156 and 157, said pulleys and belts being so arranged that when the arms 154 and 155 are moved toward each other, as illustrated in Fig. 11, the belts engage the rubber article on the mandrel passing through station E. The pulleys 156 are preferably carried by bearing blocks 159 adjustably mounted on the arms whereby the belt may be tensioned as desired. The pulleys 157 are carried on shafts 160 on which are fixed sprockets 161 operatively connected by chains, belts or the like 162 with sprockets 163 fixed on the shafts 152 and 153, which also mount sprockets 164 which are operatively connected by a chain belt 165 with a sprocket 166 driven by a suitable prime mover, such as an electric motor 167, that is adjustably carried by the bracket 148. Operation of the motor 167 drives the sprockets 164 and 163 and said motion is imparted by chains 162 to the sprockets 161, which in turn drive the pulleys to move the belts 158, the arrangement of the drives being such that the adjacent runs of the belts 158 move toward the post 149 or toward the free end of the mandrel.

The arms 154 and 155 are moved toward and away from the mandrels by means of a pair of toggle links 168 and 169 which are pivotally mounted as at 170 on the respective arms 154 and 155, the adjacent ends of said toggle links being pivotally connected by a pin 171 which is slidably mounted in a slot 172 of a bar 173 fixed on the post 149 and extending between the arms 154 and 155 whereby when the links are substantially in alignment, as illustrated in Fig. 10, the arms 154 and 155 are spaced apart sufficiently for the mandrels and rubber articles thereon to pass between the belts 158 without contacting same. When the links are pivoted and moved to the position shown in Fig. 11, the arms are moved together whereby the belts 158 contact the rubber articles on the mandrel and movement of the belts rolls the articles and discharges same from the end of the mandrel. The link 168 has an extension above the arm 154 and has a slot 174 engaged over a pin 174' on a head 175 mounted on a shaft 176 which is operated by the armature of a solenoid 177 rigidly mounted on a bracket 178 fixed on the post 149.

When a defective article passes through station D in contact with the element 118 permitting an electric current to flow from the element to the mandrel to complete the high tension electric circuit, the solenoid 177 is energized and draws the shaft 176 toward the solenoid 177 and swings the links to the position shown in Fig. 11, whereby the arms 154 and 155 are moved to position the belts 158 for engagement with the rubber article on the mandrel as said mandrel moves between the belts. The solenoid, and electric circuit therefor, hold the discharge mechanism in position for discharging the defective article until the mandrel has passed completely between the belts 158, then the solenoid is deenergized and a spring 179, having ends connected to the shaft 176 and to the arm 154, returns the links to the position shown in Fig. 10 whereby the mandrels may move freely between the belts. The angle of the arms 154 and 155 and the runs of the belts thereon relative to the mandrels is such that the points of contact of the belts and the rubber article being rolled from the mandrel are substantially vertically of the axis of the mandrel whereby the rubber article is rolled completely from the mandrel before the end of the mandrel leaves the contact of the belts.

It is possible that in some instances the rubber article will adhere to the end of the mandrel and not be completely discharged therefrom. To eliminate such possibility a nozzle 180 is directed toward the end of the mandrel adjacent the end thereof and said nozzle connected with a source of air pressure, whereby a jet of air blows the article from the end of the mandrel as said mandrel leaves the station E. The jet of air from the nozzle is controlled by a valve 181 which is operated by engagement of a mandrel passing thereby, and is timed whereby the valve is opened only when a mandrel is aligned with the nozzle in such a manner that the jet of air is at the end of the mandrel and blows any rolled article therefrom.

The cam rail 54 is so positioned that it supports the mandrels in a substantially horizontal position throughout their course from the point of entering station D until they enter station A. The rubber articles that have passed the test are still wet and there is a tendency for the water to coalesce and it is desirable that the water be spread to increase the surface thereof exposed to the air and facilitate drying of the rubber articles. The mandrels are advanced through station F in contact with a plurality of brushes 182 supported between the cam rail 54 and a frame member 183 spaced outwardly relative to the ends of the mandrels. Other brushes 184 are suitably mounted on the frame member 183 for contact with the ends of the articles 38 on the mandrels.

The mandrels are advanced from station F into station G where the rubber articles are dried. At station G the conveyor chain 1 and mandrels carried thereby advance through a housing 185, said housing having an open end 186 into which the mandrels and chain conveyor enter and an open end 187 through which the mandrels leave station G. Suitably heated air is discharged by a blower 188 into a duct 189 which has communication with the housing 185 adjacent the open end 187. The heated air passes the length of the housing 185 in counterflow to the direction of movement of the mandrels therethrough, said heated air being discharged from the open end 186 of the housing. The air is moved through the housing in sufficient quantity that any water on the rubber articles carried by the mandrels is dried without heating the rubber articles excessively. As the mandrels leave station G they pass through station H where those mandrels having rubber articles thereon are counted.

A counter mechanism 190 is actuated by a solenoid 191 or the like whereby the counter is advanced one unit each time a circuit is completed to the solenoid. The solenoid is connected to a suitable source of current and energization of the solenoid is controlled by a switch 192 having contacts that are moved into engagement by means of a plunger or the like so positioned as to be engaged by each of the mandrels as they pass through station H. Therefore, the switch operates to complete the circuit for every mandrel. In order to prevent operaton of the counter when there is no rubber article on the mandrel engaging the plunger, an electric eye or selenium cell 193 is positioned relative to a mandrel to receive a reflected beam of light from a light source 194. The beam of light is of such intensity that the reflected beam from the polished mandrels energizes the selenium cell which provides a current in a solenoid 195 which breaks the circuit to the counter solenoid, but the rubber articles, not being of a polished or highly reflective surface, do not reflect sufficient light in the beam to activate the selenium cell sufficiently to provide enough current to energize the solenoid 195. Therefore when a mandrel having a rubber article thereon passes in engagement with the switch plunger, circuit is completed to the counter solenoid and said counter advanced one unit, but when the mandrel is empty, circuit to the counter solenoid is interrupted and the counter remains in the same position which provides an accurate count of the rubber articles carried through station H by the mandrels.

Located at station I is a housing 199 extending over and substantially enclosing the mandrels passing through said station. The end walls 200 and 201 and the side wall 202 adjacent the chain conveyor 1 are provided with openings 203 through which the mandrels extend while passing through said housing. A powder container or sifter 204 is secured on the top wall 205 of the housing 199 adjacent the end wall 200, said powder container extending above and below the top wall 205 with the lower end 206 of said powder container spaced slightly above the portion of the mandrel carrying the rubber article, said container having a width substantially coextensive with the length of the rubber article on the mandrel. A screen of finely woven cloth 207 or the like is mounted at the lower end of the powder container and a quantity of powder placed therein whereby the normal vibration in the machine will cause a small quantity of powder to drop through the woven cloth screen 207 and onto the rubber articles carried by the mandrels as they advance through the housing 199. A cover 208 is removably mounted on the upper end of the powder container 204 to close same, said cover being removable to permit inspection or replenishing the powder in the container.

A block 209 is suitably mounted in the housing 199 below the path of the mandrels and under the powder container 204. The upper face of the block is covered with fleece or like material 210 with the bristles thereof extending upwardly into engagement with the rubber articles carried on the mandrels, the block and fleece thereon being so arranged as to also contact the ends of the article. The block 209 is preferably mounted on members 211 vertically adjustable relative to the bottom 212 of the housing 199, whereby the block and fleece thereon may be adjusted to regulate the contact of the bristles of the fleece with the rubber article. The powder dropping from the powder container 204 drops on the rubber article and also on the fleece 210, and the contact of the article with the fleece distributes the powder over all of the surface of the rubber article. In order to facilitate the distribution of the powder on the article, a gear rack 213 of such length that it extends beyond the ends of the block 209 is supported on a bracket 214 mounted on the track member 7 and extending upwardly and over the chain conveyor 1 and arm 35 whereby the rack 213 meshes with the gear 50 on each mandrel to effect rotation of the mandrel as it is advanced in the housing 199 over the powder distributing fleece 210.

The powder is very fine and normally would tend to escape through the opening 204 and be deposited on other portions of the apparatus as well as creating discomfort for the operators. This escape of the powder is prevented by providing partitions 215 adjacent to but spaced from the walls 200 and 202, said partitions converging toward the edges of the openings 203 to form a narrow slot therebetween. Suitable vacuum connections 216 have communication with the space between the partitions 215 in the walls 200 and 202, whereby air is drawn from the space between the partitions creating a flow of air entering said space through the slots with sufficient velocity to draw any powder therein that would otherwise tend to escape from the housing 199.

Station J is located in the housing 199 adjacent the end wall 201, and at station J is suitable mechanism 217 for engaging and rolling the rubber article from the mandrel and automatically discharging the rolled article into a duct 218 which delivers the finished article to a point for further handling, packaging, etc. The rolling and discharging mechanism consists of vertically spaced bearing supports 219 and 220 positioned above and below the path of the mandrels whereby the mandrels may move therebetween, as illustrated in Fig. 15. Each of the bearing supports carries bearings 221 spaced longitudinally thereof which rotatably mount pulleys 222 and 223 which are operatively connected by continuous belts 224. The bearing supports, pulleys and belts are arranged in the housing 199 at an angle to the mandrels, as illustrated in Fig. 16, whereby the point of contact between the adjacent runs of the belts 224 and the roll of the rubber article being removed from the mandrel is substantially in vertical alignment with the axis of the mandrel as said mandrel is advanced between the belts. The bearing supports are adjustably mounted in the housing 199 by means of screws 225 and wedges 226 operated by adjusting screws 227 whereby the bearing supports and the adjacent runs of the belts 224 are adjusted toward or away from the mandrels passing therebetween to provide proper contact between the adjacent runs of the belts and the rubber article being removed from the mandrels. Each of the pulleys 223 is secured to shafts 228 on which are mounted sprockets 229, each of which is operatively connected by a chain 230 with a driving sprocket 231 suitably driven by a motor or the like 232 for imparting motion to the belts 224 whereby the inner runs of same move toward the duct 218.

Normally the belts 224 throw the rubber articles with sufficient velocity that said article is completely removed from the mandrel and thrown into the duct 218, however, in the event that the article sticks to the end of the mandrel it is blown therefrom and into the duct 218 by a jet of air issuing from a nozzle 233 which is connected by a pipe 234 to a suitable source of compressed air or the like. The flow of air issuing from the nozzle is controlled by a valve 235 which is opened by engagement of a mandrel passing thereby, the opening of the valve being timed whereby the jet of air is directed immediately upon the end of the mandrel and toward the duct 218.

As the mandrels are advanced from the station J they move onto station A where the operators again place rubber articles thereon for printing, testing and powdering.

In operation of the apparatus, an operator or operators located at station A will slip thin rubber articles 38 to be processed over the mandrels, said mandrels extending substantially horizontally and being advanced in stationary condition to facilitate these operations. The mandrels then pass to station B and as they do so swing downwardly and inwardly to a substantially vertical position. The mandrels having no rubber articles thereon are detected by the electrical contacts 92 and 93 and the circuit connected thereto effecting energization of the solenoid 94 to move said empty mandrels outwardly into engagement with the guide track 99 which elevates and supports the empty mandrels until after they have passed station C. The mandrels having rubber articles thereon advance and rotate with the rubber article in engagement with the printing or branding stamp 63 which is inked by the inking rollers 77 intermediately of the passing of the mandrel and rubber article thereon in contact with the branding stamp. The mandrels then pass to station C and as they do so swing upwardly and outwardly whereby they will pass over the wall of the tank 101. The mandrels having rubber articles thereon then swing downwardly and inwardly to a substantially vertical position whereby the rubber article is immersed in the water solution 103 and then advanced between the partition 115 and the adjacent wall of the tank. The movement of the mandrels through the tank effects the movement of the water solution therein whereby the entire body of water is maintained substantially at the same temperature by the heater 114. The mandrels having rubber articles thereon are then swung upwardly and outwardly to a substantially horizontal position as they move over the end of the tank 101. The articles, being wet, will remove some of the water solution from the tank 101, this water being replaced by flow of water through the pipe 104 under control of the float valve 106 to maintain the desired level of water solution in the tank.

All of the mandrels then pass in substantially horizontal position to station D in which they are engaged by the element 119 and the rubber articles thereon are engaged by the element 118 and electrical roller contact 144, the mandrels being rotated while in engagement with the elements and roller to assure complete contact of the entire rubber article with the elements and roller. The mandrels are so spaced that only one mandrel and rubber article thereon can be in contact with the elements at any given time. If perfect articles are on the mandrels these will prevent the passage of high tension current between the elements and the metal mandrels and will pass along for succeeding operations in the apparatus. If, however, imperfect articles are on the mandrels these permit the flow of electricity in the high tension circuit and cause the solenoid 177 to be energized and to remain so until the mandrel with imperfect articles thereon advances beyond the belts 158 and the imperfect goods removed from the mandrel by said belts which are moved into article-engaging position by the swinging of the arms 154 and 155 toward each other by operation of the links 168 and 169 by the solenoid 177. If the imperfect article is not completely removed from the mandrel, it is blown therefrom by a jet of air from the nozzle 180 in response to tripping of the valve 181. Before a succeeding mandrel reaches elements 118 and 119, the electric circuit is opened, deenergizing the solenoid 177 whereby the spring 179 operates the links 168 and 169 to move the arms 154 and 155 apart for free movement of succeeding mandrels between the belts 158. The high tension electric circuit is then in condition for electrically testing the rubber articles on succeeding mandrels.

The mandrels are then advanced through station F in engagement with brushes 182 and 184 to spread any water on the rubber articles to facilitate drying thereof. The mandrels then advance through the housing 185 in station G where heated air is passed over said mandrels and articles thereon to completely dry the articles. As the mandrels leave station G they advance through station H where each mandrel actuates the switch 192, actuating the counter when there is a rubber article on the mandrel. If the mandrel is empty, light reflected from the polished surface of the mandrel activates the selenium cell 193 causing the solenoid to break the normal circuit to the counter and preventing operation thereof whereby an accurate count of the mandrels having perfect articles thereon is obtained. The mandrels then advance into the housing 199 at station I and are rolled in contact with the fleece 210 for distributing powder over the rubber articles, said powder being continually sifted over the articles and fleece by the normal vibration of the apparatus. The mandrels then advance to station J where the belts 224 engage the rubber articles on the mandrels rolling the article and discharging same from the mandrel into the duct 218. If the article is not completely removed from the mandrel, a jet of air from the nozzle 233 under control of the valve 235 blows the article from the mandrel and into the duct 218 where it is delivered to a point of further handling or packaging of the article. The mandrels then return to station A where they are again loaded with articles to be processed.

It is believed obvious that I have provided a method and apparatus that is accurate and automatic in operation for branding and testing thin rubber prophylactic articles whereby any hole, perforation or wall sections below minimum thickness are detected and the imperfect articles rejected, and the perfect articles powdered, rolled, counted and discharged from the apparatus and delivered to a point for further handling.

What I claim and desire to secure by Letters Patent is:

1. Apparatus for processing thin, hollow, flexible rubber articles or the like comprising, a mandrel of electroconductive material arranged to receive and support an article thereon without wrinkling, a tank containing a liquid, means for lowering and raising the mandrel in and out of the tank for substantially immersing the article on said mandrel for wetting said article, an electric contact arranged to be engaged by the mandrel after the article is removed from the liquid and while the article is wet, a flexible element of electroconductive material arranged to engage the wet article and conform to a portion thereof simultaneously with engagement of the electric contact and mandrel, means applying liquid to the flexible element to maintain same in wet condition, means for rotating the mandrel while the contact and flexible element engage the mandrel and article respectively, means for maintaining a high potential of electricity between the flexible element and mandrel whereby the electricity will flow therebetween and complete a circuit to manifest presence of a defective article when the article is perforated or has a wall thickness below normal, and means operable responsive to completion of said circuit for discharging the defective article from the mandrel.

2. Apparatus for processing thin, hollow, flexible rubber articles or the like comprising, a mandrel of electroconductive material arranged to receive and support an article thereon without wrinkling, a tank containing a liquid in which said article is substantially immersed on said mandrel for wetting said article, an electric contact arranged to be engaged by the mandrel after the article is removed from the liquid and while the article is wet, a flexible element of electroconductive material arranged to engage the wet article and conform to a portion thereof simultaneously with engagement of the electric contact and mandrel, a resilient member electrically connected with said flexible element and engaging the wet article at the end of the mandrel while the article is engaged by the flexible element, means applying liquid to the flexible element and resilient member to maintain same in wet condition, means for rotating the mandrel while the contact engages the mandrel and the flexible element and resilient member engage the article, means for maintaining a high potential of electricity between the flexible element, resilient member and mandrel whereby the electricity will flow therebetween and complete a circuit to manifest presence of a defective article when the article is perforated or has a wall thickness below normal, means operable responsive to completion of said circuit for discharging the defective article from the mandrel, and means for rolling the perfect articles from the mandrels.

3. Apparatus for processing thin, hollow, flexible rubber articles or the like comprising, a frame, an endless conveyor, means on the frame defining a path of movement of the conveyor, a plurality of spaced mandrels of electroconductive material mounted on the conveyor and arranged to receive and support articles thereon, means for moving the conveyor in its defined path, a tank containing a liquid through which article carrying mandrels are moved for substantially immersing the articles and wetting same, an electric contact arranged to be engaged by the mandrels after the articles are removed from the liquid and while the articles are wet, a flexible element of electroconductive material arranged to engage the wet articles and conform to a portion thereof simultaneously with engagement of the electric contact and mandrels, a liquid supply, means connected with the liquid supply for applying liquid to the flexible element to maintain same in wet condition, means for maintaining a high potential of electricity between the flexible element and mandrel whereby the electricity will flow therebetween and complete a circuit to manifest presence of defective articles when said article is perforated or has a wall thickness below normal, means operable responsive to completion of said circuit for discharging the defective article from the mandrel, and mechanical means for removing perfect articles from the mandrels.

4. Apparatus for processing thin, hollow, flexible rubber articles or the like comprising, a frame, an endless conveyor, track members on the frame and having engagement with the conveyor for defining a path of movement of same, a plurality of spaced mandrels of electroconductive material rotatably mounted on the conveyor and arranged to receive and support articles thereon without wrinkling, means for continuously moving the conveyor in the path defined by the track members, means disposed along the conveyor and engageable with the mandrels during movement of the conveyor for defining the inclination of the mandrels, a tank containing a liquid through which article carrying mandrels are moved for substantially immersing the articles and wetting same, an electric contact arranged to be engaged by the mandrels after the articles are removed from the liquid and while the articles are wet, a flexible element of electroconductive material arranged to engage the wet articles and conform to a portion thereof simultaneously with engagement of the electric contact and mandrels, liquid supply, a perforate trough connected to the liquid supply and supported above the flexible element for dripping liquid thereon to maintain same in wet condition, means for rotating the mandrels while the contact and flexible member engage the mandrel and article respectively, means for maintaining a high potential of electricity between the flexible element and mandrel whereby the electricity will flow therebetween and complete a circuit to manifest presence of defective articles when said article is perforated or has a wall thickness below normal, means operable responsive to completion of said circuit for discharging the defective article from the mandrel, and mechanical means for removing perfect articles from the mandrels.

5. Apparatus for processing thin, hollow, flexible rubber articles or the like comprising, a frame, an endless conveyor, track members on the frame and having engagement with the conveyor for defining a path of movement of same, a plurality of spaced mandrels of electroconductive material rotatably and pivotally mounted on the conveyor and arranged to receive and support articles thereon without wrinkling, means for continuously moving the conveyor in the path defined by the track members, cam members disposed along the conveyor and engageable with the mandrels during movement of the conveyor for varying the angularity of the mandrels and for simultaneously rotating the mandrels during such variation of angularity, a tank containing a liquid into which mandrels are lowered for substantially immersing the articles and wetting same, an electric contact arranged to be engaged by the mandrels after the articles are removed from the liquid and while the articles are wet, a flexible element of electroconductive material arranged to engage the wet articles and conform to portions thereof simultaneously with engagement of the electric contact and mandrel, resilient member electrically connected with said flexible element and engaging the wet article at the end of the mandrel while the article is engaged by the flexible element, means applying liquid to the flexible element and resilient member to maintain same in wet condition, means for rotating the mandrel while the contact engages the mandrel and the flexible element and resilient member engage the article, means for maintaining a high potential of electricity between the flexible element, resilient member and mandrel whereby the electricity will flow therebetween and complete a circuit to manifest presence of a defective article when said article is perforated or has a wall thickness below normal, means operable responsive to completion of said circuit for discharging the defective articles from the mandrels, means for drying perfect articles on the mandrels, and mechanical means for removing perfect articles from the mandrels.

6. Apparatus for processing thin, hollow, flexible rubber articles or the like comprising, a frame, an endless conveyor, track members on the frame and having engagement with the conveyor for defining a path of movement of same, a plurality of spaced mandrels of electroconductive material rotatably and pivotally mounted on the conveyor and arranged to receive and support articles thereon without wrinkling, means for continuously moving the conveyor in the path defined by the track members, cam members disposed along the conveyor and engageable with the mandrels during movement of the conveyor for varying the angularity of the mandrels throughout a predetermined range extending from above a horizontal plane down to a substantially vertical plane and for simultaneously rotating the mandrels during such variation of angularity, electrical means including contacts with which the mandrels cooperate in succession for detecting empty mandrels, a tank containing a liquid adjacent a portion of the cam members which lower the mandrels to a substantially vertical plane, means responsive to the electrical means for moving empty mandrels to a substantially horizontal plane whereby they bypass the tank of liquid and only article carrying mandrels are lowered by the cam members into the liquid for substantially immersing the articles and wetting same, an electric contact arranged to be engaged by the mandrels after the articles are removed from the liquid and while the articles are wet, a flexible element of electroconductive material arranged to engage the wet articles and conform to portions thereof simultaneously with engagement of the electric contact and mandrel, means for rotating the mandrel while the contact and flexible element engage the mandrel and article respectively, means for maintaining a high potential of electricity between the flexible element and mandrel whereby the electricity will flow therebetween and complete a circuit to manifest presence of a defective article when said article is perforated or has a wall thickness below normal, means operable responsive to completion of said circuit for discharging the defective article from the mandrel, means for engaging the wet perfect articles and spreading the liquid thereon, means for applying a heated current of air to the perfect articles for drying same on the mandrels, a counter, electric means for operating the counter including a circuit completed by the moving of the mandrel past a predetermined point, means responsive to light reflected from empty mandrels and not responsive to light reflected from articles on mandrels for interrupting the circuit to the counter to prevent counting empty mandrels passing said predetermined point, and mechanical means for removing perfect articles from the mandrels.

CHARLES H. FRY.

REFERENCES CITED

The following references are of record in the file of this patent:

UNITED STATES PATENTS

| Number | Name | Date |
|---|---|---|
| 2,221,323 | Gammeter | Nov. 12, 1940 |
| 2,299,270 | Gammeter | Oct. 20, 1942 |
| 2,501,676 | Ives | Mar. 28, 1950 |
| 2,503,803 | Cremer | Apr. 11, 1950 |